(12) United States Patent
Stabile

(10) Patent No.: US 6,944,393 B1
(45) Date of Patent: Sep. 13, 2005

(54) PANEL MADE OF A HIGHLY INSULATED ELECTROTHERMAL FABRIC

(75) Inventor: Aldo Stabile, Crema (IT)

(73) Assignee: Cadif Srl, S. Giovanni Lupatoto (IT)

( * ) Notice: Subject to any disclaimer, the term of this patent is extended or adjusted under 35 U.S.C. 154(b) by 0 days.

(21) Appl. No.: 10/030,336

(22) PCT Filed: Jun. 30, 1999

(86) PCT No.: PCT/IT00/00193

§ 371 (c)(1),
(2), (4) Date: Nov. 13, 2001

(87) PCT Pub. No.: WO00/70270

PCT Pub. Date: Nov. 23, 2000

(30) Foreign Application Priority Data

May 14, 1999 (IT) .......................................... MI99A1056

(51) Int. Cl.⁷ .............................................. F24D 19/02
(52) U.S. Cl. ......................... 392/435; 219/542; 29/611
(58) Field of Search .................................. 392/435, 434, 392/436; 219/542, 546, 548, 345, 545, 568, 387; 29/611; 428/209, 594, 78; 250/505.1

(56) References Cited

U.S. PATENT DOCUMENTS

| | | | | |
|---|---|---|---|---|
| 2,573,120 A | | 10/1951 | Wandelt | |
| 3,746,837 A | * | 7/1973 | Frey et al. | 219/387 |
| 3,961,157 A | * | 6/1976 | Miller et al. | 219/345 |
| 4,250,398 A | * | 2/1981 | Ellis et al. | 219/345 |
| 4,294,003 A | * | 10/1981 | Coverstone | 29/611 |
| 4,471,212 A | * | 9/1984 | Hager, Jr. | 219/345 |
| 4,474,841 A | * | 10/1984 | Kerekes | 428/78 |
| 4,980,564 A | * | 12/1990 | Steelmon | 250/505.1 |
| 4,990,747 A | * | 2/1991 | K.indo | 392/435 |
| 5,098,795 A | * | 3/1992 | Webb et al. | 428/594 |
| 5,422,462 A | * | 6/1995 | Kishimoto | 219/545 |
| 5,817,405 A | * | 10/1998 | Bhatt et al. | 428/209 |
| 5,910,267 A | * | 6/1999 | Stricker | 219/548 |
| 6,353,707 B1 | * | 3/2002 | Loktev et al. | 392/435 |
| 6,365,882 B1 | * | 4/2002 | Stabile | 219/542 |

FOREIGN PATENT DOCUMENTS

| | | | |
|---|---|---|---|
| DE | 22 29 808 A | 3/1974 | |
| DE | 26 20 602 A | 12/1977 | |
| DE | 29716362 | * 1/1998 | ............. F41H/3/02 |
| FR | 2760821 | * 9/1998 | ........... F24C/15/06 |
| GB | 2278188 | * 11/1994 | ............. F24H/3/00 |
| JP | 62079270 | * 4/1987 | ............. B32B/7/02 |
| JP | 63277353 | * 11/1988 | ............. E04D/1/30 |
| JP | 401249441 | * 10/1989 | ........... B32B/31/12 |
| JP | 07101938 | * 11/1996 | ........... H01L/23/14 |
| WO | 98 26222 A | 6/1998 | |

* cited by examiner

*Primary Examiner*—Robin O. Evans
(74) *Attorney, Agent, or Firm*—Michael J. Striker

(57) ABSTRACT

Panel (10) for generating and diffusing heat obtained from a heat-radiating board (30) comprising one or more pieces of electrothermal fabric, with strips of fibreglass laid side by side to form the warp, the weft (50) consisting of a continuous copper wire (51), small in diameter and of considerable length, coated with insulating material, that extends serpentinewise passing alternatively above and below the strips of fibreglass, said board (30) being completed by intermediate and external layers (35, 36) of epoxidic thermoadhesive material and clad on both surfaces with sheets of micanite (31, 32), so that on connecting the ends of the wire (51) forming the weft (50) to a source of electric current, boring holes (65, 66) using means, that may be a laser beam, on the thermoadhesive layer (35, 36) covering the weft (50), this latter converts electric energy into thermal energy.

1 Claim, 4 Drawing Sheets

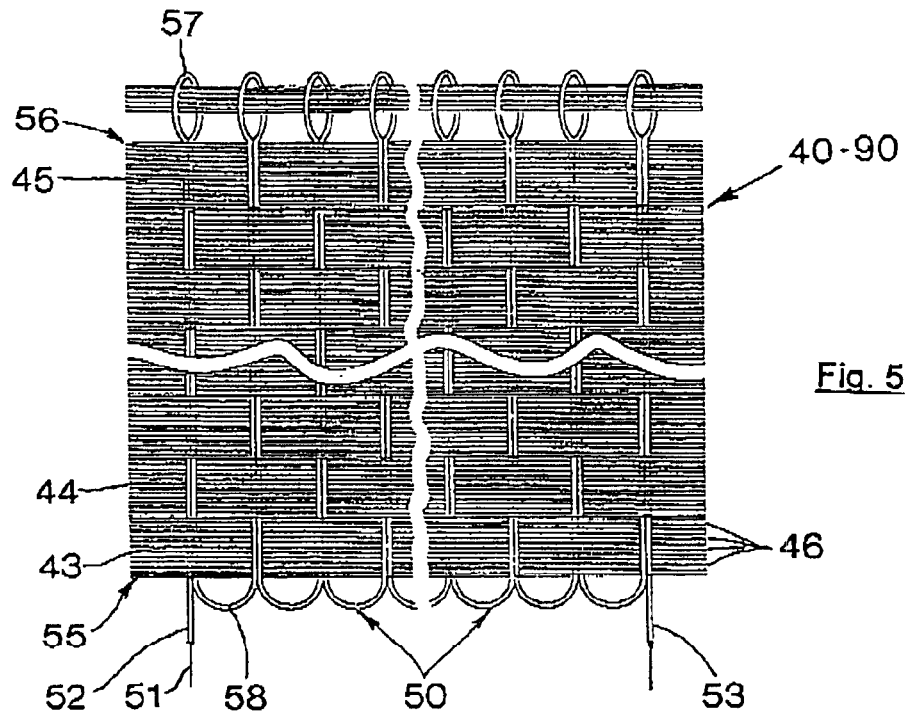
Fig. 5
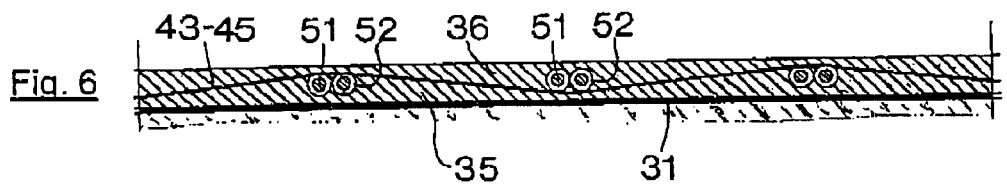
Fig. 6
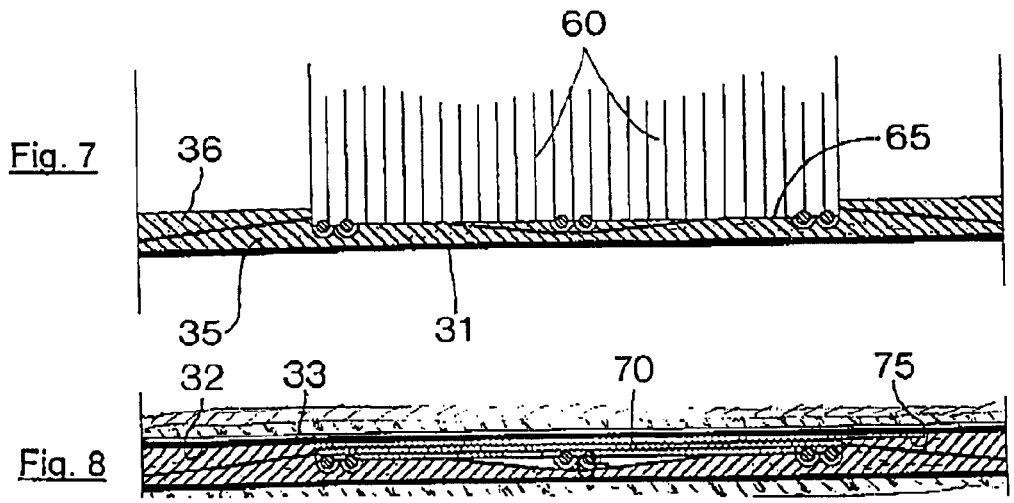
Fig. 7
Fig. 8

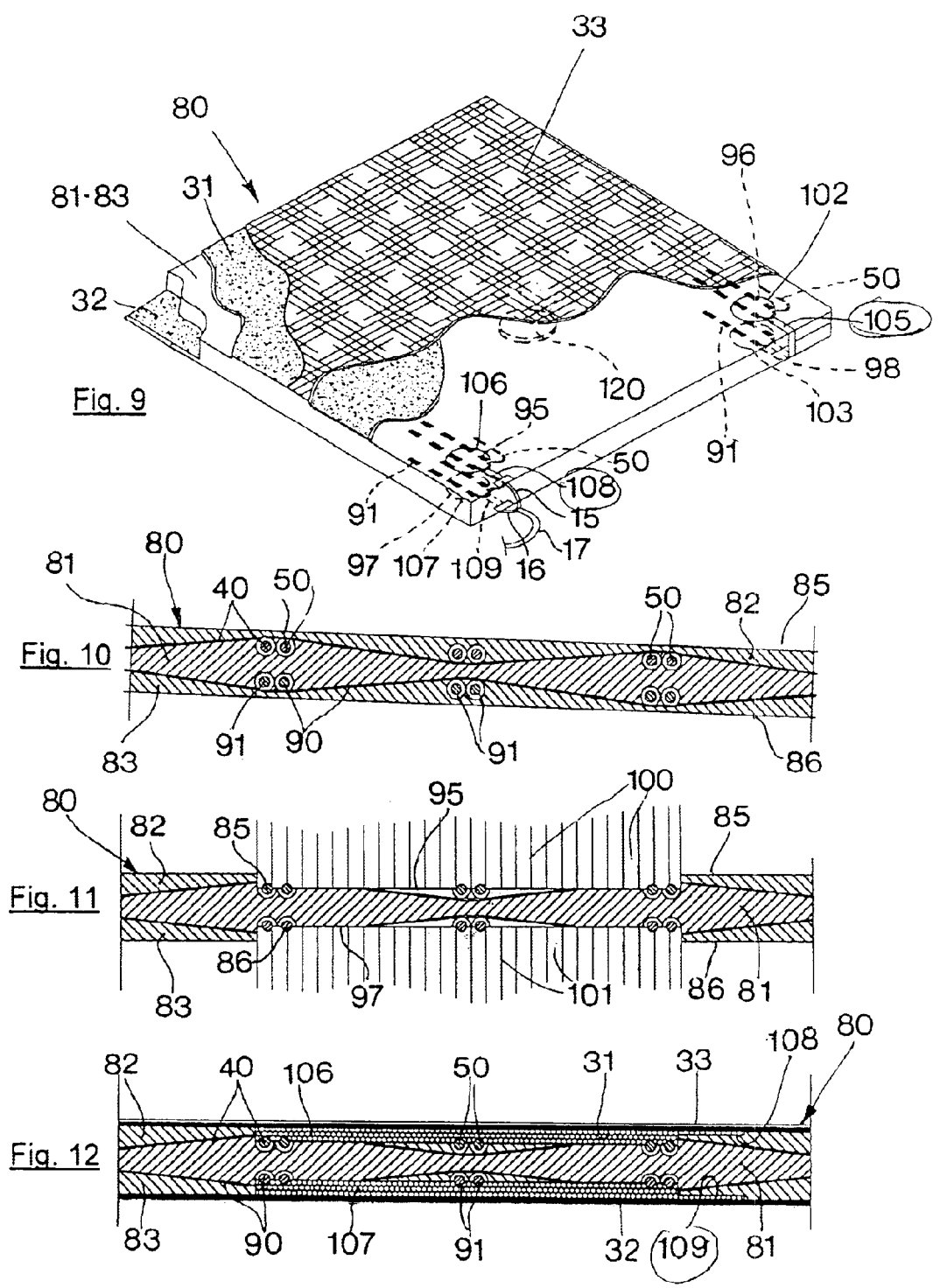

PANEL MADE OF A HIGHLY INSULATED ELECTROTHERMAL FABRIC

BACKGROUND OF THE INVENTION

The invention concerns means for generating heat for indoor use by electric current.

There are innumerable systems and means for generating heat for this purpose by electricity.

These systems are based on the use of highly resistant materials which, if electric current is passed through them, reach very high temperatures at a great concentration of heat.

Such heat is nearly always much more than the environment would require and must therefore be diffused by means of complex and costly devices specially made for the purpose.

The high temperatures in the head conductors render necessary certain means of support made of special and fragile materials such as ceramic and the like, and complex insulation and coating structures.

These structures rapidly wear out because of the high temperatures they have to carry.

Thermal efficiency, especially if compared with other means of heating by fuels, is very low because of the high thermal difference between the electric resistances and room temperature The means of heating are also bulky and, from the practical and aesthetic points of view, are difficult to combine with the furniture.

SUMMARY OF THE INVENTION

The above invention solves these problems, offering a means of electric heat that is flat, small in size and light in weight, as well as being highly insulated, as will be explained below.

Subject of the disclosure is a panel for generation and diffusion of heat having on it an electrothermal fabric, and a board of heat radiating material consisting of one or more pieces of said fabric. Said fabric presents continuous weft wires, coated with highly insulating material and having electric contacts at their ends.

Intermediate and external layers of thermoadhesive material complete the board, covered on both sides by a mica-based material.

By connecting the electric contacts to a source of electricity, the weft wires convert electric energy into thermal energy and, through the sheets of mica-based material, radiate heat throughout the environment.

The warp threads of the pieces of fabric consist of thin parallel threads of fibre glass laid side by side.

The weft wires run continuously from a first corner on a first side of the piece of fabric, crosswise to the weft wires, first passing above a first face of the first strip, above the second face of the next strip, above the first face of the strip next again, and so on till it reaches the opposite side of the piece.

From there, after making a bend at 180°, said wire returns to the first side, closely aligned the whole previously inserted length.

From this first side, after making a another 180° bend, said wire returns to the opposite side of the piece passing above the second face of the first strip, above the first face of the next strip, above the second face of the strip next again, and so on until the whole weft weave of the piece has been completed.

This way of laying of the conductor in lengths placed side by side, passed through by electric current in the opposite direction of flow, eliminates the electric fields.

Advantageously, the highly conductive weft wire is of copper.

The electrical contacts are connected at the two ends of the wire that forms the weft weave, to be used to convert electric current into thermal energy, creating, by suitable means, a hole in the thermo-adhesive layer that covers one face of the electrothermic sheet.

This hole also passes through the insulation of the wire, a weld, or equivalent means, being put into said hole to connect said wire to an electric contact.

The hole may be produced by a grinder, by sanding or by a laser beam.

Being laser, said beam penetrates the insulating lining on the metal wire of the weft weave, but is repelled by the metal itself.

The heat radiating plate is mounted inside a protective frame.

This frame consists of two halves, of a constant section at an angle of 90°, shape and internal dimensions corresponding to the external dimensions and shape of the main parts of the panel, and being provided with means for a stable assembly.

The external dimensions of one half of the frame correspond to the internal dimensions of the other half.

The shape of the panel is preferably square.

The external sheets of the panel are of micanite. This consists of small flakes of mica glued onto paper or cloth.

In another execution the external sheets are of micarta. The supporting material for micarta is a fabric of fibreglass which can be impregnated with polyester or epoxy resins.

A thermal sensor is placed centrally on the heat radiating plate: its contacts can be connected to the two ends of a break in the continuous wire that forms the weft.

This sensor breaks the electric circuit of the heat-radiating plate when its temperature exceeds a certain level.

In one type of execution the heat-radiating sheet comprises two superimposed pieces of electrothermal fabric with a thermoadhesive layer in between and at the ends.

The weft wires of the two pieces of superimposed fabric can be connected in parallel or in series.

The thermoadhesive material is preferably epoxidic.

The face of the heat-radiating board that will be on view can be covered with a sheet of decorative melamine.

The invention offers evident advantages.

In view of the nature of this mineral, the mica-based sheets, such a micanite, micarta and the like, ensure maximum electrical insulation and at the same time maximum diffusion of the heat on account of their being so thin, even only a few tenths of a millimetre thick, while at the same time ensuring good mechanical strength and maximum electrical insulation.

Comprising as it does one or more pieces of thermoelectric fabric with the weft weave formed of a highly conductive wire, the heat radiating plate also ensures maximum thermal efficiency, even though it is so thin, bulk and weight as well being minimum.

The width and length of the panel can be decided as preferred, to make it useful for a variety of purposes.

The possibility of applying a decorative sheet to the surface on view, or even of decorating the face of the mica-based material, helps to make the panel suitable for any environment and for placing in any position Characteristics and purposes of the disclosure will be made still clearer by the following examples of its execution illustrated by diagrammatically drawn figures.

BRIEF DESCRIPTION OF THE DRAWINGS

FIG. 5 Detail of the electrothermal fabric comprised in the heat radiating board.

FIG. 6 Detail of the heat-radiating board, a cross section.

FIG. 7 As above with a laser making a blind hole.

FIG. 8 As above, with an electric contact being welded into the blind hole.

FIG. 9 Heat-radiating board with two pieces of electrothermal fabric, perspective.

FIG. 10. Cross section of the board in FIG. 9.

FIG. 11. The board in FIG. 9 with a laser beam making two blind holes facing in opposite directions.

FIG. 12. As above with an electric contact being welded into the blind holes.

DETAILED DESCRIPTION OF THE PREFERRED EMBODIMENTS

Figure 1:
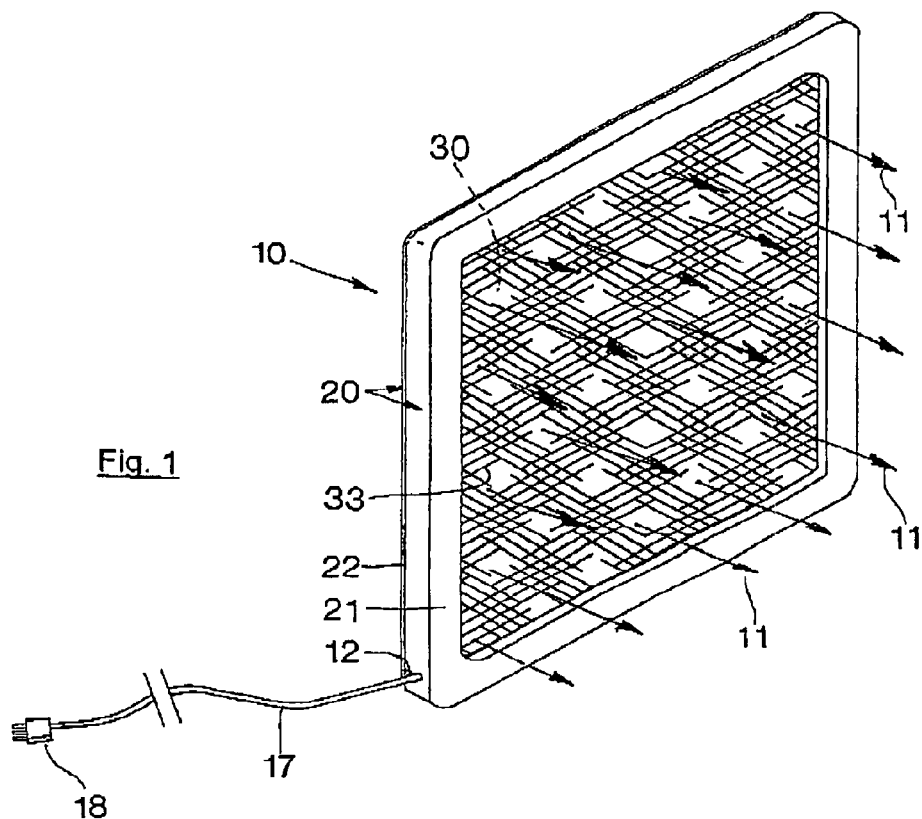
FIG. 1. Panel with a heat-radiating board comprising a piece of electrothermal fabric, with surrounding frame, perspective.
Figure 2:
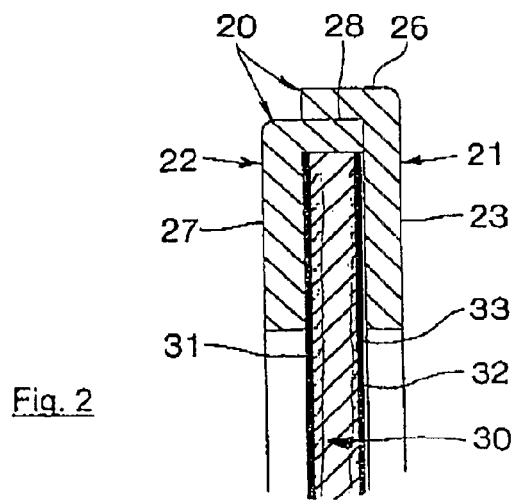
FIG. 2 Cross section of the panel.

The square panel 10 comprises the electrothermal sheet 30 protected by the frame 20 consisting of the two halves 21 and 22.

The half-frame 21 presents a front 23 and edge 26 at 90°.

The half frame 22 presents a front 27 and edge 28, also at 90°.

The external dimensions of the half-frame 22 correspond to the internal dimensions of the other half 21 so that one fits firmly into the other to form a stable frame.

The heat-radiating board 30 is formed of a place 40 of special fabric placed between two layers, 35 and 36, of epoxidic thermoadhesive material and is clad on the two outer faces by pieces 31 and 32 of micanite.

A decorative sheet 33 of melamine paper is laid on the surface to remain on view.

The piece 40 of special fabric (FIG. 5) presents a warp 43–45 and a weft 50.

The warp is formed of parallel strips 43–45 laid side by side, each strip being formed of fibreglass threads 46.

The weft 50 is formed of a continuous copper wire 51 coated with insulating paint 52.

The copper wire is inserted at one end, for example 55 (on the left low down in FIG. 5), of one side of the piece 40, crosswise to the fibreglass strips 43–45, passing alternatively on the first, on the second, on the first face, and so on, of the successive strips 43–45, emerging at the second end 56 (above, on the left, in the figure) of the opposite side of the piece, and after making an 180°-bend 57, returns into the piece alongside the first already mentioned length of wire so returning to the first side 55.

After making another 180° bend 58, it once more returns to the fabric, at a distance from the first length corresponding substantially to the width of the strips 43–45 as far as the opposite side of the piece 40, and so on to complete the weft as indicated, for example, by the end 53 of the wire.

It will therefore be seen that by joining electric contacts at any two points in the weft, obviously first removing the coating 52 on the copper wire 51, an electric circuit can be closed on the length of wire between said points so generating heat by converting electric energy into thermal energy.

FIGS. 6–8 show the method followed to do this.

The holes 65, 66 are made by the laser beam 60 on the surface of the thermoadhesive layer 36. Said beam perforates the thermoadhesive layer 36 and the coating 52 on the copper wire 51.

The electric contacts 75, 76 can therefore be connected at the two ends of the length of copper wire between the two holes, by welds 70, 71 made in the holes 65, 66.

Said contacts 75, 76 are connected to the electric wires 15, 16 that bring in mains electricity through the cable 17 and plug 18.

FIG. 9 shows a heat-radiating board 80 comprising two pieces 40, 90 of special fabric with an intermediate layer 81 and two outer layers 82, 83 of epoxidic thermoadhesive material.

The board is clad on its two surfaces by pieces of micanite 31, 32.

FIGS. 9–12 show how mains electricity can be used to feed both the wefts 50 and 91 of copper wire in the pieces of fabric 40 and 90 by connecting the wires 15, 16 in the cable 17 to contacts 108, 109. These contacts are fixed to said wefts 50 and 91 by welds 106, 107 (FIGS. 9 and 12) made inside the pairs of holes 95 and 97 in the two faces 85 and 86 of the plate 80 by laser beams 100 and 101 at the ends of said wefts 50 and 91.

By making further holes 96 and 98 (FIG. 9) at the other ends of wefts 50, 91, and creating an electric bridge 105 to connect said ends by welds 102 and 103 made in said holes, wefts 50 and 91 become electrically connected in series.

FIG. 9 shows, practically in the centre of the upper surface of the heat-radiating board 80, a discoid sensor 120 with switch whose contacts are connected to the two separated ends of the copper warp below said upper surface.

It follows that, when the temperature of the heat-radiating board exceeds a certain pre-set value in the sensor, the switch in said sensor automatically opens thus opening the electric circuit and preventing further generation of heat until the temperature has fallen to the pre-set level.

Figure 3:
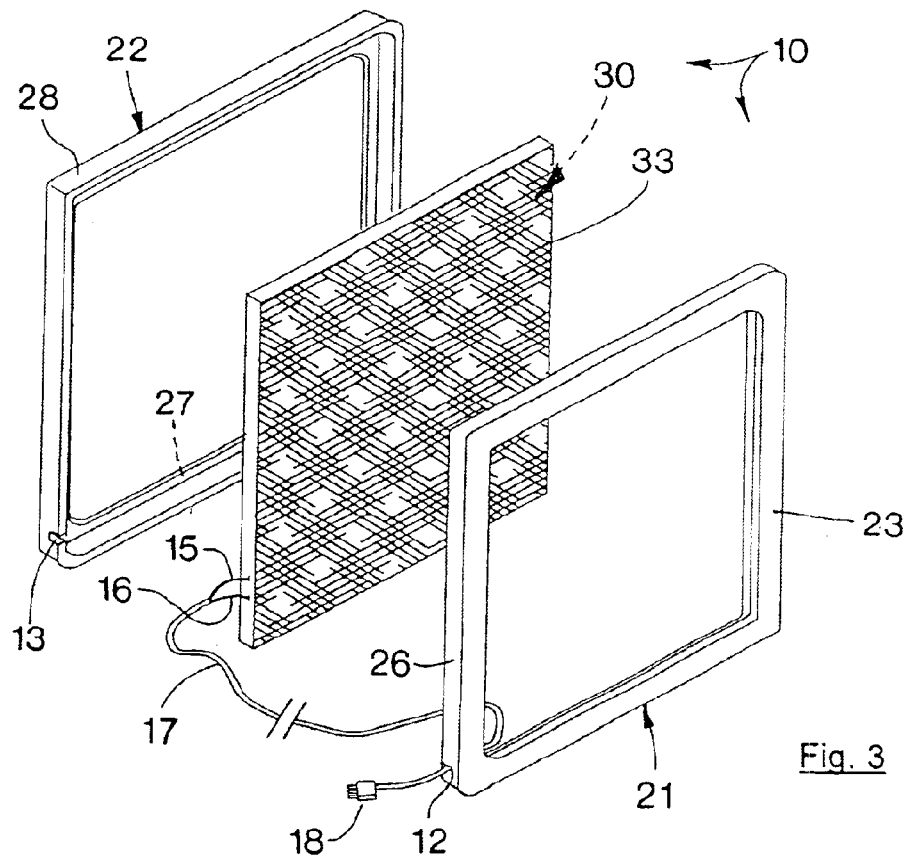
FIG. 3 An exploded view of the panel.
Figure 4:
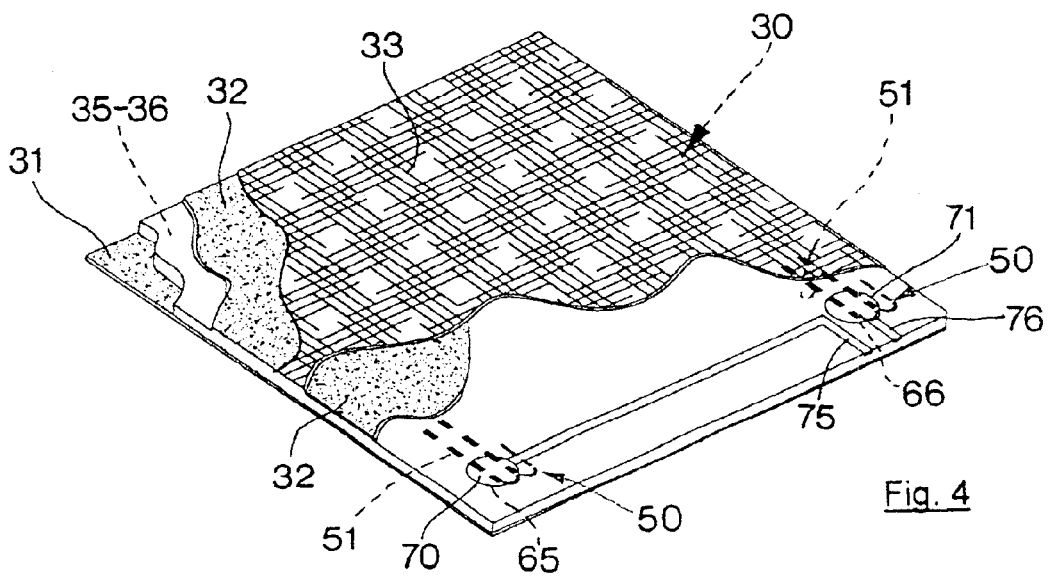
FIG. 4 The heat-radiating board showing its component parts, perspective.

As will be seen in FIG. 3, the electric cable 17, with plug 18, passes through the two opposite cavities, respectively 12 in the half frame 21 and 13 in the half frame 22.

On completing assembly, the panel appears as in FIG. 1.

When the plug 18 is plugged in to an electric socket, the copper weft wires 50 and 91 in the pieces ot thermoelectric fabric 40 and 80, receive current and heat up to a moderate temperature of about 100° C, the heat so generated, on passing through the micanite, is radiated outwards from the panel to the environment as shown by the arrrows 11.

The surface of the .panel on view shows the decorative sheet of melamine 33.

Micanite is well known to be an insulating material consisting of a stiff or flexible sheet made from flakes of mica, of muscovite in particular.

To give it greater mechanical strength, micanite sheets may be made with the mica flakes glued onto paper or cloth. As an alternative, micarta may be used, this consisting of tiny flakes of pure mica mixed to form a paste without glue, then compressed and felted.

Micarta may be given a cloth or glass base or be impregnated with polyester and epoxy resins.

As the case may require, the sheets of micanite shown in the figures can therefore be replaced by sheets of micarta and the like.

What is claimed is:

1. A method for formation of a panel for generating and diffusing heat, comprising the steps of:

providing a board having one or two pieces of fabric with a weft of continuously highly-conductive metal wire coated with insulating material and with a warp formed of parallel strips laid side-by-side, wherein said parallel strips are formed of fiberglass threads placed side-by-side;

forming intermediate and external layers of thermal adhesive epoxy material in relation to the pieces of fabric;

providing first electrical contacts at a short distance from ends of the metal wire, wherein said first electrical contacts are connected to a source of electric current;

forming holes in the insulating layer of thermoadhesive epoxy material that coats the pieces of fabric, at two ends of the metal wire weft, using laser beams, which, by their nature, are repelled by the metal of the wire;

connecting the first electrical contacts to the ends of the metal wire of the waft by welds inserted in said holes;

extending the wire constituting the waft continuously from a first corner on a first side of the piece of fabric, crosswise to the warp strips passing over a first face of a first strip, over a second face of a next strip, over a first face of a strip next again and so on to reach an opposite side of the place and from there, after marking a bend at 180°, returning said wire toward the first side closely aligned alone a hole of a previously inserted length and from the first side so that said wire makes a bend at 180° and returns towards the opposite side of the pipe passing over a second face of the first strip, over a first face of the next strip, over a second face of the strip next again and so on to complete a whole weft of the piece, providing an effect of aligning the lengths of a conductive wire through which electric current passes on an opposite direction of flow, being to eliminate harmful electric field.

* * * * *